2,992,240
NEW DYESTUFFS
Frank Lodge, Manchester, England, assignor to Imperial Chemical Industries Limited, London, England, a corporation of Great Britain
No Drawing. Filed Sept. 22, 1958, Ser. No. 762,217
Claims priority, application Great Britain Oct. 4, 1957
3 Claims. (Cl. 260—380)

This invention relates to new dyestuffs and more particularly it relates to new dyestuffs of the anthraquinone series which are especially valuable for dyeing acetate rayon and other artificial fibres.

According to the invention there are provided new dyestuffs of the formula:

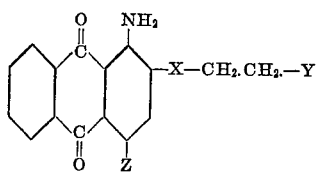

where X represents an oxygen or a sulphur atom, Z represents a hydroxyl or an amino- radical, Y represents a chlorine or bromine atom or an aryl, aryloxy, arylthio, arylsulphonyl, —O.CH$_2$CH$_2$R, —SCH$_2$CH$_2$R or

—SO$_2$—CH$_2$CH$_2$R radical wherein R is a chlorine or bromine atom or a hydroxy-, alkyloxy-, aryloxy-, arylthio-, arylsulphonyl-, β-hydroxyethoxy-, β-chloroethoxy-, β-bromoethoxy-, β-aryloxyethoxy-, β-arylthioethoxy, β-alkoxyethoxy-, β-arylaminoethoxy-, or β-N-aryl-N-alkylaminoethoxy- group.

As examples of the groups represented by Y there may be mentioned phenyl, phenoxy, o-, m-, or p-methylphenoxy, p-methoxyphenoxy, p-hydroxyphenoxy, phenylthio, p-tolylthio, p-tolylsulphonyl, β-chloroethoxy, β-bromoethoxy, β-hydroxyethoxy, β-methoxyethoxy, β-phenoxyethoxy, β-p-cresoxyethoxy, β-phenoxyethylthio, β-phenoxyethylsulphonyl, β-phenylmercaptoethoxy, β-benzenesulphonylethoxy, β-(β'-hydroxyethoxy)ethoxy, β-(β'-methoxyethoxy)ethoxy, β-(β'-chloroethoxy)ethoxy, β-(β'-bromoethoxy)ethoxy, β-(β'-phenoxyethoxy)ethoxy, β-(β'-phenylmercaptoethoxy)ethoxy, β-(β'-phenylaminoethoxy)ethoxy.

According to a further feature of the invention there is provided a process for the manufacture of the new dyestuffs wherein X stands for an oxygen atom and Y represents an aryl, aryloxy, arylthio, arylsulphonyl, —OCH$_2$CH$_2$R, —SCH$_2$CH$_2$R or —SO$_2$CH$_2$CH$_2$R radical wherein R is a hydroxy, alkyloxy, aryloxy, arylthio, arylsulphonyl, β-hydroxyethoxy, β-aryloxyethoxy, β-alkoxyethoxy, β-N-arylaminoethoxy or β-N-aryl-N-alkylaminoethoxy group which comprises reacting a 2-aryloxyanthraquinone of the formula:

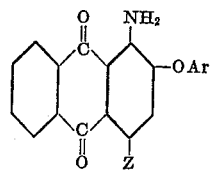

wherein Z stands for a hydroxyl or an amino radical and Ar represents an aryl radical with an alcohol of the formula:

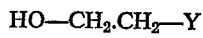

HO—CH$_2$.CH$_2$—Y wherein Y represents an aryl, aryloxy, arylthio, arylsulphonyl, —OCH$_2$CH$_2$R, —SCH$_2$CH$_2$R or —SO$_2$CH$_2$CH$_2$R radical wherein R is a hydroxy, alkyloxy, aryloxy, arylthio, arylsulphonyl, β-hydroxyethoxy, β-aryloxyethoxy, β-alkoxyethoxy, β-N-arylaminoethoxy or β-N-aryl-N-alkylaminoethoxy group.

As examples of the aryl group represented by Ar there may be mentioned phenyl, o-, m- or p-methylphenyl, p-methoxyphenyl and p-phenylphenyl.

This process of the invention is conveniently carried out by heating the reactants together in the presence of sodium hydroxide or potassium hydroxide, adding water and/or sodium bicarbonate to the reaction mixture and isolating the dyestuff.

As examples of the 2-aryloxyanthraquinones which may be used in this process of the invention there may be mentioned 1-amino-4-hydroxy-2-phenoxyanthraquinone, 1:4-diamino-2-phenoxyanthraquinone, 1-amino-4-hydroxy-2-p-methylphenoxyanthraquinone and 1-amino-4-hydroxy-2-p-methoxyphenoxyanthraquinone and as examples of suitable alcohols of the formula HO—CH$_2$.CH$_2$Y which may be used in this process of the invention there may be mentioned β-phenylethanol, β-phenoxyethanol, β-p-cresoxyethanol, β:β'-dihydroxydiethyl ether, β-(β'-phenoxyethoxy)ethanol, β-(β'-p-cresoxyethoxy)ethanol, β-(β'-m-cresoxyethoxy)ethanol, β-(β'-phenylmercaptoethoxy)ethanol, β-(β'-benzenesulphonylethoxy)ethanol, β-(β'-p-methoxyphenoxyethoxy)ethanol, di(β-hydroxyethoxy)ethane, β:β'-dihydroxydiethylsulphide and β-(β'-phenylaminoethoxy)ethanol.

The alcohols of the formula HO—CH$_2$—CH$_2$—Y where Y represents a β-aryloxyethoxy or β-arylthioethoxy group may be obtained by condensing the benzoate of β-chloro-β'-hydroxydiethylether with the sodium salt of a phenol or thiophenol respectively and hydrolysing the ester formed with an aqueous solution of sodium hydroxide.

The alcohols of the formula HO—CH$_2$—CH$_2$—Y where Y represents a β-arylsulphonylethoxy group may be obtained by oxidising an acetic acid solution of the corresponding thio compound with hydrogen peroxide.

The alcohols of the formula HO—CH$_2$—CH$_2$—Y where Y represents a β-N-arylaminoethoxy or a β-N-aryl-N-alkylaminoethoxy group may be obtained by condensing the benzoate of β-chloro-β'-hydroxydiethylether with an arylamine or a N-aryl-N-alkylamine respectively and hydrolysing the ester formed with an aqueous solution of sodium hydroxide.

The alcohols of the formula HO—CH$_2$—CH$_2$—Y where Y represents a β-aryloxyethylthio, β-arylthioethylthio, β-N-arylaminoethylthio or β-N-aryl-N-alkylaminoethylthio group may be obtained by condensing the benzoate of β-chloro-β'-hydroxydiethylsulphide with the sodium salt of a phenol, the sodium salt of a thiophenol, an arylamine or a N-aryl-N-alkylamine respectively and hydrolysing the esters formed with an aqueous solution of sodium hydroxide.

The alcohols of the formula HO—CH$_2$—CH$_2$—Y where Y represents a β-aryloxyethylsulphonyl, β-arylsulphonylethylsulphonyl, β-N-arylaminoethylsulphonyl or β-N-aryl-N-alkylaminoethylsulphonyl group may be obtained by oxidising an acetic acid solution of the corresponding thio compounds with hydrogen peroxide.

The alcohols of the formula HO—CH$_2$—CH$_2$—Y where Y represents a β-arylsulphonylethylthio group may be obtained by condensing the sodium salt of thioglycol with an aryl β-chloroethylsulphone.

According to a further feature of the invention there is provided a process for the manufacture of the new dyestuffs wherein X stands for an oxygen atom and Y represents an aryl, aryloxy, arylthio, arylsulphonyl, —OCH$_2$CH$_2$R, —SCH$_2$CH$_2$R or —SO$_2$CH$_2$CH$_2$R radical wherein R is a hydroxy, alkyloxy, aryloxy, arylthio, arylsulphonyl, β-hydroxyethoxy, β-aryloxyethoxy, β-alkoxyethoxy, β-N-arylaminoethoxy or β-N-aryl-N-alkylaminoethoxy group which comprises reacting a 2-halogenoanthraquinone of the formula:

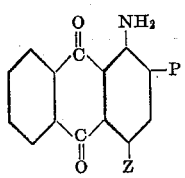

wherein Z stands for a hydroxyl or an amino radical and P stands for a halogen atom with an alcohol of the formula HO—CH₂.CH₂—Y wherein Y represents an aryl, aryloxy, arylthio, arylsulphonyl, —OCH₂CH₂R, —SCH₂CH₂R or —SO₂CH₂CH₂R radical wherein R is a hydroxy, alkyloxy, aryloxy, arylthio, arylsulphonyl, β-hydroxyethoxy, β-aryloxyethoxy, β-alkoxyethoxy, β-N-arylaminoethoxy or β-N-aryl-N-alkylaminoethoxy group.

This process of the invention is conveniently carried out by heating the reactants together in the presence of a phenol and potassium carbonate, adding an organic liquid, for example ethanol, in which the dyestuff is insoluble and subsequently isolating the dyestuff by filtration.

As examples of the 2-halogenoanthraquinones of the above formula which may be used in this process of the invention there may be mentioned 1-amino-2-bromo-4-hydroxyanthraquinone and 1:4-diamino-2-chloroanthraquinone.

According to a further feature of the invention there is provided a process for the manufacture of the new dyestuffs as hereinbefore defined wherein X stands for a sulphur atom which comprises reacting 1-amino-4-hydroxy - 2 - mercapto - anthraquinone or 1:4 - diamino-2-mercapto-anthraquinone with a halogen compound of the formula:

Hal.CH₂.CH₂.Y where Hal represents a halogen atom and Y represents a chlorine or a bromine atom or an aryl, aryloxy, arylthio, arylsulphonyl, —O.CH₂CH₂R, —SCH₂CH₂R or

—SO₂—CH₂CH₂R radical wherein R is a chlorine or bromine atom or a hydroxy-, alkoxy-, aryloxy-, arylthio-, arylsulphonyl-, β-hydroxyethoxy-, β-chloroethoxy-, β-bromoethoxy-, β-aryloxyethoxy-, β-arylthioethoxy, β-alkoxyethoxy-β-N-arylaminoethoxy- or β-N-aryl-N-alkylaminoethoxy- group.

As examples of halogen atoms represented by Hal there may be mentioned chlorine and bromine.

This process of the invention may be conveniently carried out by heating the reactants together in a suitable solvent, for example ethanol, in the presence of sodium hydroxide or potassium hydroxide, and isolating the dyestuff which is obtained.

The halogen compounds of the formula, Hal.CH₂CH₂Y may be obtained by treating the corresponding alcohol of the formula HO.CH₂CH₂Y with a halogenating agent.

As examples of suitable halogen compounds of the formula Hal.CH₂CH₂Y which may be used in this process of the invention there may be mentioned β-phenoxyethyl bromide, β-(β'-phenoxyethoxy)ethyl chloride, sym-dichlorodiethyl ether, sym-dibromodiethyl ether, β-phenylethyl bromide and β-(β'-phenylaminoethoxy)ethyl bromide.

According to a further feature of the invention there is provided a process for the manufacture of the new dyestuffs as hereinbefore defined wherein Y stands for a chlorine or a bromine atom or R represents a chlorine or bromine atom or a β-chloroethoxy or β-bromoethoxy group which comprises reacting a new dyestuff as hereinbefore defined wherein X stands for an oxygen atom and Y stands for a hydroxy group or R represents a hydroxy or β-hydroxyethoxy group with a chlorinating or brominating agent.

This process of the reaction may be conveniently carried out by reacting the dyestuffs containing a β-hydroxyethyl group with a chlorinating or brominating agent, for example thionyl chloride, in the presence of an organic base, for example pyridine, in a suitable solvent, for example nitrobenzene. The solvent may then be removed by steam distillation and the dyestuff isolated by filtering the residual suspension.

As examples of suitable dyestuffs containing a β-hydroxyethyl group which may be used in this process of the invention there may be mentioned 1-amino-4-hydroxy-2 - β[β' - (β'' - hydroxyethoxy)ethoxy]ethoxyanthraquinone, 1 - amino - 4 - hydroxy - 2 - β(β' - hydroxyethoxy)ethoxy anthraquinone, 1:4-diamino-2-β-(β'-hydroxyethoxy)ethoxyanthraquinone and 1 - amino - 4 - hydroxy - 2 - β[β' - (β'' - hydroxyethoxy)ethoxy]ethylmercaptoanthraquinone.

According to a further feature of the invention there is provided a modified process for the manufacture of new dyestuffs as hereinbefore defined wherein X stands for an oxygen atom and Y represents an aryl, aryloxy, arylthio, arylsulphonyl, —OCH₂CH₂R, —SCH₂CH₂R or —SO₂CH₂CH₂R radical wherein R is a hydroxy, alkyloxy, aryloxy, arylthio, arylsulphonyl, β-hydroxyethoxy, β-aryloxyethoxy, β-alkoxyethoxy, β-N-arylaminoethoxy or β-N-aryl-N-alkylaminoethoxy group which comprises reacting 1-amino - 4 - hydroxyanthraquinone - 2 - sulphonic acid or 1:4-diaminoanthraquinone 2-sulphonic acid with an alcohol of the formula HO—CH₂—CH₂—Y wherein Y represents an aryl, aryloxy, arylthio, arylsulphonyl, —OCH₂CH₂R, —SCH₂CH₂R or —SO₂CH₂CH₂R radical wherein R is a hydroxy, alkyloxy, aryloxy, arylthio, arylsulphonyl, β-hydroxyethoxy, β-aryloxyethoxy, β-alkyloxyethoxy, β-N-arylaminoethoxy or β-N-aryl-N-alkylaminoethoxy group in the presence of sodium hydroxide or potassium hydroxide.

This process of the invention may be conveniently carried out by stirring a mixture of the 1:4-disubstituted anthaquinone-2-sulphonic acid, the alcohol and sodium hydroxide or potassium hydroxide at a suitable temperature, for example 85° to 90° C. and adding an organic liquid, for example ethanol, in which the dyestuff is insoluble and subsequently isolating the dyestuff by filtration.

As examples of suitable alcohols which may be used in this process of the invention there may be mentioned β-phenylethanol, β-phenoxyethanol, β-(β'-phenoxyethoxy) ethanol, di(β-hydroxyethoxy)-ethane, β-(β'-hydroxyethoxy)ethanol, β-(β'-methoxyethoxy)ethanol and β-(β'-phenylmercaptoethoxy)ethanol.

According to a further feature of the invention there is provided a modified process for the manufacture of the new dyestuffs as hereinbefore defined wherein Y contains an aryloxy or arylthio residue which comprises reacting a dyestuff as hereinbefore defined wherein Y contains a β-chloroethyl or β-bromoethyl group or Y stands for a halogen atom with an aromatic hydroxy or thio compound.

This process of the invention may be conveniently carried out by reacting the dyestuff wherein Y contains a β-chloroethyl or β-bromoethyl group or Y stands for a halogen atom with an aromatic hydroxy or thio compound in the presence of sodium hydroxide or potassium hydroxide, adding an organic liquid, for example ethanol, in which the dyestuff is insoluble and isolating the precipitated dyestuff by filtration.

As examples of suitable aromatic hydroxy or thio compounds which may be used in this process of the invention there may be mentioned phenol, o-cresol, m-cresol, p-cresol, p-methoxyphenol, 4-hydroxydiphenyl, 4-hydroxydiphenylether, thiophenol and thiocresol, and as examples of suitable dyestuffs wherein Y contains a β-chloroethyl or β-bromoethyl group or Y stands for a halogen atom which may be used in this process of the invention there may be mentioned 1-amino-4-hydroxy-2-β-chloroethoxyanthraquinone, 1 - amino - 4 - hydroxy-2-β-(β'-chloroethoxy)ethoxyanthraquinone, 1-amino - 4 - hydroxy - 2β [β'-(β'' - chloroethoxy)ethoxy]ethoxy anthraquinone, 1:4-diamino-2-β-(β' - bromoethoxy)ethoxyanthraquinone and 1 - amino - 4 - hydroxy - 2-β-bromoethylmercaptoanthraquinone.

As specific examples of new dyestuffs of the invention there may be mentioned 1-amino-4-hydroxy-2-β-phenoxyethoxyanthraquinone, 1-amino - 4 - hydroxy - 2 - β-(β'-chloroethoxy) anthraquinone, 1 - amino - 4 - hydroxy - 2 - β-(β'-bromoethoxy)ethoxy anthraquinone, 1-amino - 4 - hydroxy - 2 - β(β'-phenoxyethoxy)ethoxy anthraquinone, 1-amino - 4 - hydroxy - 2 - β-(β'-hydroxyethoxy)ethoxy anthraquinone, 1-amino - 4 - hydroxy - 2-β[β'-(β''-hydroxyethoxy)ethoxy]ethoxy anthraquinone, 1-amino - 4 - hydroxy - 2 - β - (β'-phenylmercapto)ethoxy anthraquinone, 1-amino - 4 - hydroxy - 2-β-(β'-chloroethoxy) ethylmercaptoanthraquinone, 1-amino - 4 - hydroxy - 2 - β-(β'-phenoxyethoxy)ethylmercaptoanthraquinone, 1-amino - 4 - hydroxy-2-β-phenoxyethylmercaptoanthraquinone, 1:4 - diamino-2-β-(β'-phenoxyethoxy)ethylmercaptoanthraquinone, 1:4-diamino - 2 - β - (β'-chloroethoxy)ethoxyanthraquinone and 1:4 - diamino - 2 - β-[β'-(β''-phenoxyethoxy) - ethoxy]ethoxyanthraquinone.

The new dyestuffs as hereinbefore defined may be dispersed by milling them with water and a dispersing agent for example disodium methylene bis-(naphthalene-2-sulphonate) to form an aqueous dispersion of the dyestuff. It is preferred to disperse the new dyestuffs by dissolving them in a solvent for example sulphuric acid, which is miscible with water, adding the solution of the dyestuff so obtained to water, filtering off the dyestuff which is precipitated and milling the dyestuff paste so obtained with water and a dispersing agent, for example sodium methylene bis-(naphthalene-2-sulphonate) to form an aqueous dispersion of the dyestuff.

If desired mixtures of two or more dyestuffs may be dispersed by these methods.

The aqueous dispersions of the dyestuffs so obtained are suitable for use in dyeing acetate rayon, cellulose triacetate or artificial fibres formed from synthetic polymeric materials, for example polyethylene terephthalate.

If desired the aqueous dispersion of the dyestuffs may be dried to form a re-dispersible powder which may be obtained in a non-dusting form by any of the processes known for forming non-dusting powders.

The new dyestuffs of the invention have very good affinity for acetate rayon and other artificial fibres which they dye in red to bluish red shades which are fast to light and which have a high resistance to the action of combustion products of coal gas.

The new dyestuffs, either singly or in the form of mixtures, are also valuable for colouring artificial fibres which can be heat set as the shades obtained are fast to heat setting treatments.

Particularly valuable dyestuffs of the invention are those wherein Y contains a β-chlorethyl or β-bromethyl group. As examples of such dyestuffs there may be mentioned 1-amino-4-hydroxy - 2 - β(β' - chloroethoxy)ethoxyanthraquinone and 1-amino-4-hydroxy-2-β[β'-(β''-chloroethoxy)ethoxy]ethoxyanthraquinone.

The invention is illustrated but not limited by the following examples in which the parts are by weight.

Example 1

30 parts of 1-amino-4-hydroxy-2-β-hydroxyethoxyanthraquinone, 100 parts of nitrobenzene and 10 parts of pyridine are stirred together at between 65° and 70° C. and a mixture of 12.5 parts of thionyl chloride and 12.5 parts of nitrobenzene is added during 30 minutes. The mixture is stirred at between 70° and 75° C. for 1 hour, cooled to 20° C. and the solid so obtained filtered off, washed with ethanol and dried.

The 1-amino-4-hydroxy-2-β-chloroethoxyanthraquinone so obtained melts at 221°–222° C.

1 part of the dyestuff is dissolved in 10 parts of a 70% aqueous solution of sulphuric acid and the solution so obtained is added with stirring to 100 parts of cold water. The precipitated dyestuff is filtered off and washed with water until free from acid. The filter-cake is then milled in the presence of disodium methylene bis-(naphthalene 2-sulphonate) to form an aqueous dispersion.

The aqueous dispersion so obtained dyes acetate rayon, cellulose triacetate and "Terylene" in red shades possessing excellent fastness properties.

Example 2

70 parts of β-phenoxyethanol and 3.6 parts of potassium hydroxide are stirred at 125° to 130° C. for 1 hour. The mixture is cooled to 100° C. and 15 parts of 1-amino-4-hydroxy-2-phenoxyanthraquinone are added. The mixture is stirred at between 125° and 130° C. for 18 hours, cooled to 20° C. and 5.5 parts of sodium bicarbonate and 46 parts of water are added. The solid is filtered off, washed with ethanol and then with water and dried at 60°–70° C. The dark red crystalline powder so obtained consists of 1-amino-4-hydroxy-2-β-phenoxyethoxyanthraquinone which melts at 198°–200° C. When dispersed in water by the method of Example 1 the dyestuff dyes acetate rayon, cellulose triacetate and "Terylene" in bright red shades possessing excellent fastness properties.

Example 3

In place of the 70 parts of β-phenoxyethanol used in Example 2 there is used 70 parts of β-p-cresoxyethanol. 1-amino-4-hydroxy-2-p-methylphenoxyethoxy anthraquinone is obtained in the form of a scarlet crystalline powder which melts at 190° C.

Example 4

215 parts of diethyleneglycol and 6 parts of potassium hydroxide are stirred at between 170° and 175° C. for 1 hour to distill off the water which is formed. The mixture is cooled to 100° C., 26 parts of 1-amino-4-hydroxy-2-phenoxyanthraquinone are added and the mixture is stirred at between 120° and 125° C. for 18 hours. The mixture is cooled to 20° C. and 9 parts of sodium bicarbonate and 150 parts of water are added. The precipitated solid is filtered off, washed with ethanol, then with water and dried. 1-amino-4-hydroxy-2-β(β'-hydroxyethoxy)ethoxyanthraquinone crystallises from butanol in the form of dark brownish-red crystals which melt at 164° C. When dispersed in water by the method of Example 1 the dyestuff dyes acetate rayon, cellulose triacetate and "Terylene" in bright red shades possessing excellent fastness to light and dry heat treatments.

Example 5

14.8 parts of 1-amino-4-hydroxy-2-β(β'-hydroxyethoxy)ethoxyanthraquinone, 27.5 parts of monochlorobenzene and 5 parts of pyridine are stirred at between 65° and 70° C. and 6.5 parts of thionyl chloride are added during 30 minutes. The mixture is then stirred at 70° C. for 1 hour. The mixture is then subjected to a steam distillation to remove the solvent and the precipitated product so obtained is filtered off, washed with water and dried. 1-amino - 4 - hydroxy-2-β(β'-chloroethoxy)ethoxyanthraquinone crystallises from benzene in the form of dark red crystals which melt at 148° C. When dispersed in water by the method of Example 1 the dyestuff dyes acetate rayon, cellulose triacetate and "Terylene" in bright red shades possessing excellent fastness to dry heat treatments and to light.

Example 6

1 part of each of the dyestuffs of Examples 4 and 5 are dissolved in 12 parts of a 70% aqueous solution of sulphuric acid at 10–15° C. The solution so obtained is added to 120 parts of cold water, and the precipitated solid is filtered off, washed with water until free from acid and the paste so obtained milled with water in the presence of disodium methylene bis(naphthalene-2-sulphonate). This aqueous dispersion of the dyestuffs so obtained dyes acetate rayon, cellulose triacetate and "Terylene" in deep red shades possessing good fastness to light and to dry heat treatments.

Example 7

50 parts of phenol and 2.5 parts of potassium hydroxide are stirred at between 160° and 170° C. for 1½ hours, to distill off the water which is formed. The mixture is cooled to 120° C., and 7.2 parts of 1-amino-4-hydroxy-2-β-(β'-chloroethoxy)ethoxyanthraquinone are added. The mixture is stirred at 180° C. for 6 hours, cooled, and 80 parts of ethanol are added. The precipitated dyestuff is filtered off, washed with ethanol then with water and dried. The dyestuff crystallises from butanol in the form of dark red crystals, which melt at 160° C. When dispersed in water by the method of Example 1 the dyestuff dyes acetate rayon, cellulose triacetate and "Terylene" in bright red shades possessing excellent fastness to dry heat treatments and light.

Red dyestuffs possessing similar fastness properties are obtained when the phenol used in the above example is replaced by o-, m- or p-cresol, p-methoxyphenol, p-phenylphenol or p-phenoxyphenol.

Example 8

70 parts of β-(β'-phenoxyethoxy)ethanol and 3.6 parts of potassium hydroxide are stirred at between 125° and 130° C. for 1 hour. The mixture is cooled to 100° C., 15 parts of 1-amino-4-hydroxy-2-phenoxyanthraquinone are added and the mixture is stirred at 125° C. for 18 hours. The mixture is then cooled to 80° C., 80 parts of ethanol and 5 parts of glacial acetic acid are added and the mixture is stirred at 20° C. for 20 hours. The precipitated dyestuff which is in the form of dark red crystals, and which is identical with the dyestuff of Example 7 is filtered off, washed with ethanol and then with water and dried.

In place of the β-(β'-phenoxyethoxy)ethanol used in the above example there may be used β-(β'-4-methylphenoxyethoxy)ethanol, β-(β'-3-methylphenoxyethoxy)ethanol, β-(β'-phenylmercaptoethoxy)ethanol, β-(β'-benzenesulphonylethoxy)ethanol, β-(β'-4-methoxyphenoxyethoxy)ethanol or β-(β'-N-methylanilinoethoxy)ethanol when dyestuffs of similar shade and fastness properties are obtained.

Example 9

120 parts of triethyleneglycol and 6 parts of potassium hydroxide are stirred at 170° C. for 1½ hours. The mixture is cooled to 100° C., 26 parts of 1-amino-4-hydroxy-2-phenoxyanthraquinone are added and the mixture is stirred at 125° C. for 18 hours. The mixture is cooled, 9 parts of sodium bicarbonate and 200 parts of water are added, and the precipitated dyestuff is filtered off, washed with a 40% aqueous solution of ethanol, then with water, and dried. 1-amino-4-hydroxy-2-β[β'-(β''-hydroxyethoxy)ethoxy]ethoxyanthraquinone crystallises from butanol in the form of dark red crystals, which melt at 96°–98° C.

When dispersed in water by the method of Example 1 an aqueous dispersion of the dyestuff is obtained which dyes acetate rayon, cellulose triacetate and "Terylene" in bright red shades possessing excellent fastness properties.

Example 10

50 parts of nitrobenzene, 15.48 parts of 1-amino-4-hydroxy-2-β[β'-(β''-hydroxyethoxy)ethoxy]ethoxyanthraquinone and 5 parts pyridine are stirred at between 65° and 70° C. and a mixture of 6.5 parts of thionyl chloride and 7 parts of nitrobenzene is added during 15 minutes. The mixture is then stirred at 90° C. for 1 hour. The mixture is then subjected to steam distillation to remove the nitrobenzene. The precipitated dyestuff so obtained is filtered off, washed with water and dried, when 1-amino-4-hydroxy-2-β[β'-(β''-chloroethoxy)ethoxy]ethoxyanthraquinone is obtained in the form of a dark red crystalline solid.

When dispersed in water by the method of Example 1 the aqueous dispersion of the dyestuff so obtained dyes acetate rayon, cellulose triacetate and "Terylene" in bright red shades possessing excellent fastness properties.

Example 11

50 parts of phenol and 2.5 parts of potassium hydroxide are stirred at between 160° and 170° C. for 1½ hours to remove the water formed. The mixture is cooled to 100° C., 8.1 parts of 1-amino-4-hydroxy-2-β[β'-(β''-chloroethoxy)ethoxy]ethoxyanthraquinone are added and the mixture is stirred at 180° C. for 6 hours. 5 parts of acetic acid are then added and the mixture so obtained is subjected to steam distillation to remove the phenol. The precipitated dyestuff is filtered off and dried. When converted to an aqueous dispersion by the method of Example 1 it dyes acetate rayon, cellulose triacetate and "Terylene" in bright red shades possessing excellent fastness properties.

In place of the phenol used in the above example there may be used o-cresol, m-cresol, p-cresol, p-methoxyphenol, 4-hydroxydiphenyl or 4-hydroxyphenylether when dyestuffs of similar shade and fastness properties are obtained.

Example 12

200 parts of β-phenylethanol and 6 parts of potassium hydroxide are stirred at 180° for 1 hour to remove the water formed. The mixture is cooled to 100° C., 26 parts of 1-amino-4-hydroxy-2-phenoxyanthraquinone are added and the mixture is stirred at 125° C. for 18 hours. The mixture is cooled to 20° C. and 9 parts of sodium bicarbonate and 80 parts of water are added. The precipitated dyestuff is filtered off, washed with ethanol, then with water and dried. 1-amino-4-hydroxy-2-β-phenylethoxyanthraquinone crystallises from butanol in the form of bluish-red crystals which melt at 160° C.

Example 13

10 parts of 2-bromo-1-amino-4-hydroxyanthraquinone, 80 parts of ethanol and 30 parts of a 25% aqueous solution of sodium disulphide are stirred at the boil under a reflux condenser for 3 hours. The mixture is subjected to a steam distillation to remove the ethanol, and a concentrated aqueous solution of hydrochloric acid is added to the aqueous solution so obtained until the mixture has a pH of 3. The precipitated solid is filtered off and washed with water.

The so-obtained aqueous paste of 1-amino-4-hydroxy-2-mercaptoanthraquinone is stirred with 80 parts of ethanol, 13.5 parts of a 32% aqueous solution of sodium hydroxide and 15 parts of β-phenoxyethyl bromide at the boil under a reflux condenser for 1 hour. The precipitated dyestuff is filtered off, washed with ethanol, then with a dilute aqueous solution of hydrochloric acid solution and dried at 60° C. The dyestuff crystallises from monochlorobenzene in the form of dark maroon-coloured crystals which melt at 147°–148° C. When converted to an aqueous dispersion by the method of Example 1 the dyestuff dyes "Terylene" in bluish rade shades possessing excellent fastness to dry heat treatments and to light.

When the β-phenoxyethyl bromide used in the above example is replaced by β-(β'-phenoxyethoxy)ethyl chloride, there is obtained 1-amino-4-hydroxy-2-β-(β'-phenoxyethoxy)ethylmercaptoanthraquinone, which melts at 123°–124° C.

Example 14

15 parts of each of the dyestuffs of Examples 2 and 8 are dissolved in 450 parts of an 80% aqueous solution of sulphuric acid at between 10° and 15° C. The solution so obtained is poured into cold water, the precipitated solid filtered off, washed acid free with water and then milled in the presence of disodium methylene bis(naphthalene-2-sulphonate) to form an aqueous dispersion. The aqueous dispersion so obtained dyes "Terylene" in red shades possessing excellent fastness properties.

*Example 15*

25 parts of the dyestuff of Example 2 and 25 parts of 1 - amino - 4 - hydroxy - 2 - β - (β' - phenoxyethoxy) ethoxyanthraquinone are dissolved in 800 parts of a 80% aqueous solution of sulphuric acid at between 10° and 15° C. The solution so obtained is poured into cold water and the precipitated dyestuff filtered off, washed acid free with water and milled in the presence of disodium methylene bis(naphthalene-2-sulphonate) to give an aqueous dispersion.

The aqueous dispersion so obtained dyes acetate rayon, cellulose triacetate and "Terylene" in red shades possessing excellent fastness properties.

*Example 16*

200 parts of thiodiglycol (β:β'-dihydroxydiethylsulphide) and 6 parts of potassium hydroxide are stirred at 170° C. for 2 hours to remove the water which is formed. The mixture is cooled to 100° C., 26 parts of 1-amino-4-hydroxy-2-phenoxyanthraquinone are added and the mixture is stirred at between 120° and 125° C. for 18 hours. The mixture is cooled to 20° C. and 9 parts of acetic acid and 200 parts of water are added. The precipitated dyestuff is filtered off, washed with water and dried.

When dispersed in water by the method of Example 1 the dyestuff dyes acetate rayon, cellulose triacetate and "Terylene" in red shades possessing excellent fastness properties.

*Example 17*

In place of the 7.2 parts of 1-amino-4-hydroxy-2-β-(β'-chloroethoxy)ethoxyanthraquinone used in Example 7 there are used 6.4 parts of 1-amino-4-hydroxy-2-β-chloroethoxyanthraquinone. 1-amino-4-hydroxy-2-β-phenoxyethoxyanthraquinone is obtained in the form of dark red crystals which melt at 200° C.

When dispersed in water by the method of Example 1 the dyestuff dyes acetate rayon, cellulose triacetate and "Terylene" in red shades possessing excellent fastness properties.

*Example 18*

A mixture of 15.9 parts of 1-amino-2-bromo-4-hydroxyanthraquinone, 15 parts of phenol, 80 parts of diethyleneglycol and 10 parts of potassium carbonate is stirred for 18 hours at 120° C. The mixture is cooled and 20 parts of acetic acid and 25 parts of ethanol are added. The precipitated solid is filtered off, washed with ethanol and dried to give a dyestuff which is identical with the dyestuff of Example 4.

What I claim:

1. Dyestuffs of the formula:

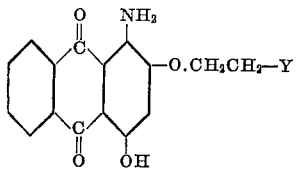

wherein Y is selected from the class consisting of —O—(monocyclic aryl), —O.CH₂CH₂Cl, —O.CH₂CH₂Br, —O.CH₂CH₂—O— (monocyclic aryl), —O.CH₂CH₂—O—CH₂CH₂Cl
—O.CH₂CH₂—O—CH₂CH₂Br and —O.CH₂CH₂—O—CH₂CH₂—O— (monocyclic aryl)

2. 1 - amino - 4 - hydroxy - 2 - β - (β' - chloroethoxy) ethoxyanthraquinone.

3. 1 - amino - 4 - hydroxy - 2 - β - [β' - (β'' - chloroethoxy)ethoxy]ethoxyanthraquinone.

References Cited in the file of this patent

UNITED STATES PATENTS

| | | |
|---|---|---|
| 1,881,752 | Lodge et al. | Oct. 11, 1932 |
| 2,441,355 | Grossmann | May 11, 1948 |
| 2,537,975 | Dickey | Jan. 16, 1951 |
| 2,568,579 | Coleman | Sept. 18, 1951 |
| 2,640,061 | Seymour et al. | May 26, 1953 |
| 2,640,062 | Seymour et al. | May 26, 1953 |
| 2,768,052 | Johnson | Oct. 23, 1956 |
| 2,844,598 | Gunthard | July 22, 1958 |
| 2,870,172 | Schoenauer | Jan. 20, 1959 |

FOREIGN PATENTS

| | | |
|---|---|---|
| 361,338 | Great Britain | Nov. 18, 1931 |

OTHER REFERENCES

Wagner et al.: "Synthetic Organic Chemistry," 2nd ed. (1953), pages 226–229 and 778–779 relied on.